(12) United States Patent
Wendt et al.

(10) Patent No.: US 8,863,248 B2
(45) Date of Patent: Oct. 14, 2014

(54) METHOD AND APPARATUS TO AUTO-LOGIN TO A BROWSER APPLICATION LAUNCHED FROM AN AUTHENTICATED CLIENT APPLICATION

(75) Inventors: David Mark Wendt, Cary, NC (US); Joseph Kubik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 13/081,562

(22) Filed: Apr. 7, 2011

(65) Prior Publication Data

US 2012/0260321 A1    Oct. 11, 2012

(51) Int. Cl.
- H04L 29/06 (2006.01)
- H04L 9/32 (2006.01)
- H04L 9/08 (2006.01)
- H04L 29/08 (2006.01)

(52) U.S. Cl.
CPC ............ H04L 9/0863 (2013.01); H04L 67/02 (2013.01); H04L 63/0838 (2013.01); H04L 63/168 (2013.01)
USPC ...................................... 726/5; 726/4; 726/6

(58) Field of Classification Search
CPC ... H04L 63/0838; H04L 63/08; H04L 63/168; H04L 63/083; G06F 21/31
See application file for complete search history.

(56) References Cited

U.S. PATENT DOCUMENTS

| | | | |
|---|---|---|---|
| 6,360,254 B1 * | 3/2002 | Linden et al. | 709/219 |
| 6,961,759 B2 | 11/2005 | Brown et al. | |
| 7,685,430 B1 | 3/2010 | Masurkar | |
| 2002/0169961 A1 * | 11/2002 | Giles et al. | 713/175 |
| 2004/0039798 A1 * | 2/2004 | Hotz et al. | 709/219 |
| 2005/0027823 A1 | 2/2005 | Rana | |
| 2005/0108517 A1 | 5/2005 | Dillon et al. | |
| 2007/0005779 A1 | 1/2007 | Yao et al. | |
| 2007/0157304 A1 | 7/2007 | Logan et al. | |
| 2007/0289004 A1 * | 12/2007 | Chao et al. | 726/9 |
| 2008/0134343 A1 * | 6/2008 | Pennington et al. | 726/28 |
| 2011/0107077 A1 * | 5/2011 | Henderson et al. | 713/150 |
| 2012/0023592 A1 * | 1/2012 | Wilson | 726/28 |

OTHER PUBLICATIONS

Di Stefano et al., "NetChaser: agent support for personal mobility," Internet Computing, IEEE, vol. 4, Issue 2, 2000, pp. 74-79.
Hsieh et al., "Stateful session handoff for mobile WWW," Information Sciences, vol. 176, Issue 9, May 8, 2006, pp. 1241-1265.
http://fishbowl.pastiche.org/2004/01/19/persistent_login_cookie_best_practice Jan. 19, 2004.
http://forums.devshed.com/php-development-5/implementing-the-remember-me-code-70972.html Jul. 2003.

* cited by examiner

Primary Examiner — Jung Kim
Assistant Examiner — Ghodrat Jamshidi
(74) Attorney, Agent, or Firm — Jeffrey S. LaBaw; David H. Judson (57) ABSTRACT

A technique for automated login to a browser application from a non-browser based client application begins upon the end user taking an action to access a target resource. A credential is associated with the client application as a result of a prior login operation. The technique is implemented in a server application associated with the client application. It enables automatic and secure passing of the client application credential to the counterpart browser application that is launched by the client application.

26 Claims, 4 Drawing Sheets

<response>http://share/connectors/openlink?url={url}&sid=123456mshani</response>

```
//pseudo-code of servlet logic
actualURL = request.getParameter("url");   ~900
key = request.getParameter("key");
cookies = mapCache.get(key);
response.setCookies(cookies);

//return HTML with redirect logic:
<script language="javascript">            ~902
window.location = actualURL;
</script>
```

FIG. 9

METHOD AND APPARATUS TO AUTO-LOGIN TO A BROWSER APPLICATION LAUNCHED FROM AN AUTHENTICATED CLIENT APPLICATION

BACKGROUND OF THE INVENTION

1. Technical Field

This disclosure relates generally to application security and, in particular, to a method to automate the passing of client application credentials to a browser application that is launched by the client application to facilitate login to a target resource.

2. Background of the Related Art

Many non-browser-based client applications also have browser-based application counterparts or features. A common use case involves an end user working within the client application after having logged into and having authenticated to a server. The server presents the end user with information, such as a list of files identified as linked resources, and the end user desires to access one of those files. When the end user then selects a target resource, the client application automatically launches the browser-based application, such as a local web browser. Even though the end user is logged in to the server with credentials within the context of the client application, launching the local web browser likely requires the web application to re-authenticate the user before the user is permitted to access the linked resource. In particular, except with respect to anonymous or public documents, the launching of the browser by the client application usually results in presenting to the user a login form. After the user enters his or her credentials, the browser is redirected to the desired page. Because the web browser does not have access to the client application's credentials (e.g., cookies), there is no easy, legal way to pass those credentials to the browser process.

One approach to address this problem is for the user to simply leave his or her logged-in browser process running at all times. This is undesirable, as it consumes local resources, and it may present a security risk if the user is not present. Another approach would be to provide a special browser plug-in that communicates with the running client application to retrieve credentials and force them into the browser process when launched; this approach also is undesirable as it would require plug-ins to be written for all different browser types. Yet another approach would be to have the client host a browser control (e.g., a Web-Kit) inside its process to control the authentication cookies. This approach, however, is undesirable as it may prevent the user from being able to use his or her favorite installed browser. Finally, while Microsoft Windows single-sign on (SSO) solution can use the local user's Windows credentials when accessing secure domains with Internet Explorer, SSO support is required.

It would be desirable to be able to provide a technique for passing a client application's credentials to a browser that is launched by that application in a manner that does not require any special browser or browser plug-in, that does not require specific web server technology, and does not require SSO functionality. This disclosure provides such a solution.

BRIEF SUMMARY OF THE INVENTION

A technique for automated login to a browser application from an authenticated client application begins upon the end user taking an action to access a target resource. A credential is associated with the client application as a result of a prior login operation. The technique is implemented in a server application associated with the client application. In response to the end user taking the action, the server application receives a first request that includes the credential. The credential is cached at a location identified by a one-time-key that is generated by the server in response to receipt of the first request. The server application then returns a response to the first request that includes a data string (e.g., a URL-template) that includes the one-time-use key. Upon receipt of that response, the client application fills in the URL-template with the target resource URL and launches the browser. The resulting second request (issued from the browser) is received at the server application, which retrieves the credential from the location identified by the one-time use key. The server application sets the retrieved credential in a cookie and returns a response to the second request. That response includes the cookie and a redirect to the target resource. In this manner, the browser is redirected to the target resource (e.g., a secure page) without requiring an extra login.

In an alternative embodiment, the above-described auto-login method is performed in an apparatus. The apparatus comprises a processor, and computer memory holding computer program instructions which, when executed, perform the method.

In another alternative embodiment, the above-described method is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
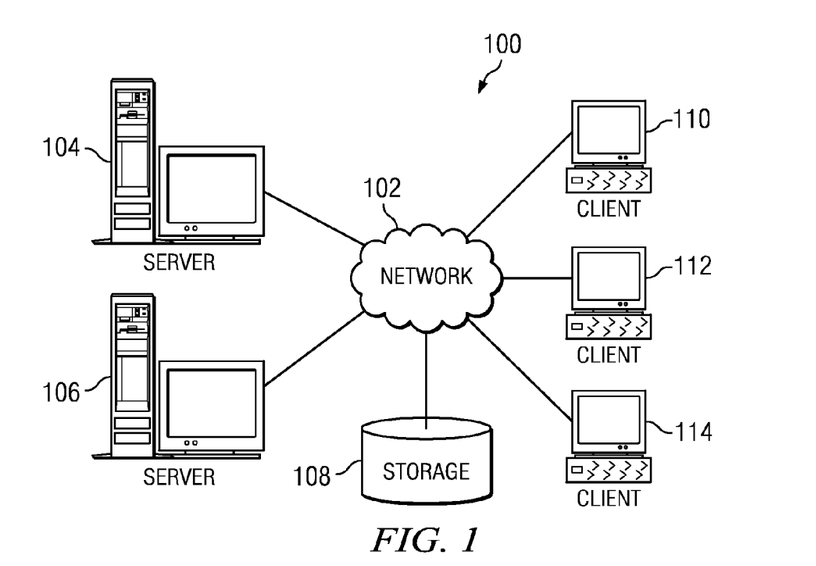
FIG. 1 depicts an exemplary block diagram of a distributed data processing environment in which exemplary aspects of the illustrative embodiments may be implemented.
Figure 2:
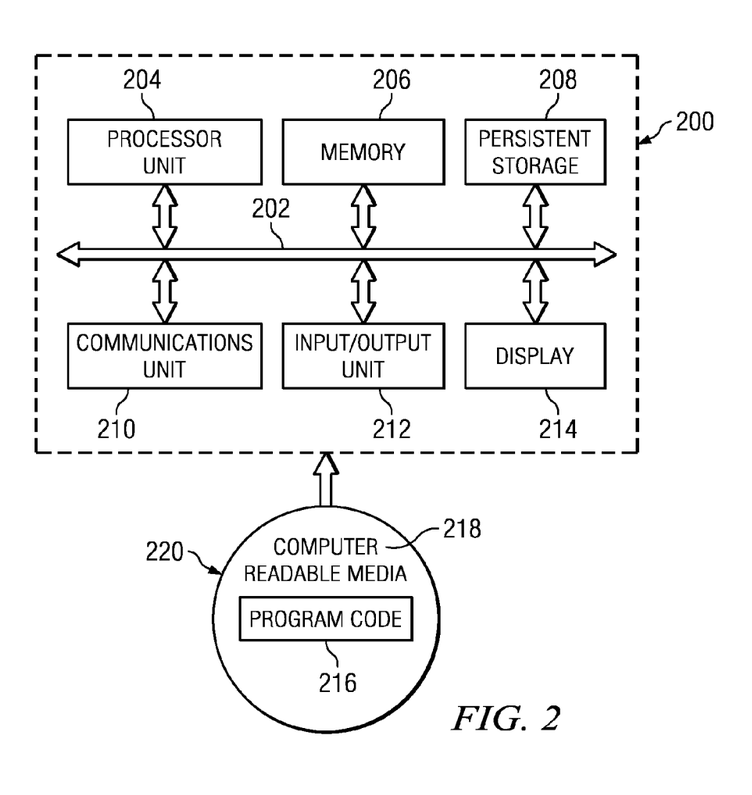
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
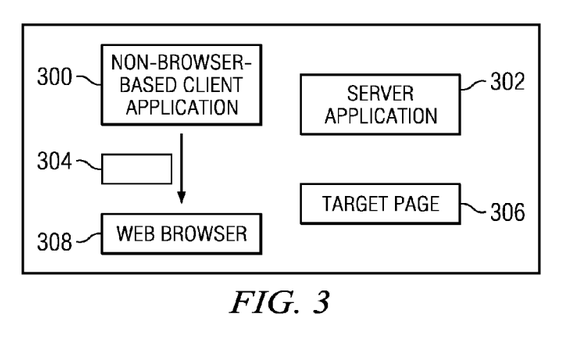
FIG. 3 illustrates a non-browser based client application and its associated server application in which the auto-login technique of this disclosure is implemented.

As will now be described, and with reference to FIG. 3, the technique that is the subject of this disclosure typically is implemented in a scenario in which a non-browser-based client application 300 is associated with a server application 302, an end user associated with the client application 300 has logged into the server application and has an associated credential 304, the end user desires to access a non-public or non-anonymous resource 306 exposed to the end user by the server application, and the access to the non-public resource 306 is performed using a browser-based application 308. The browser-based application 308 is launched by the non-browser-based client application 300 upon the end user taking a particular access with respect to the non-public resource 306, such as selecting a link in a secure page that is provided by the server application 302 to the client application 300. In a representative but non-limiting embodiment, the client application is a "rich" client, where a "rich" client is a client (of a client-server application) that supports its own interface (as opposed to merely exporting the web interface from the web application itself). A "rich" client typically is not browser-based, and it is sometimes referred to as a "thick" (as compared to a browser-based or "thin") client. An illustrative rich client application 300 is Lotus Notes®, which provides email, calendaring, contact management, and instant messaging, although rich clients can be implemented in any client-server application. The client application 300 has an associated native application server, in this case Domino® data server 302. Although not shown in FIG. 3, server application 302 may be hosted as a cloud service.

Client application 300 has an established authentication mechanism with its associated server application 302. As is well-known, authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Figure 4:
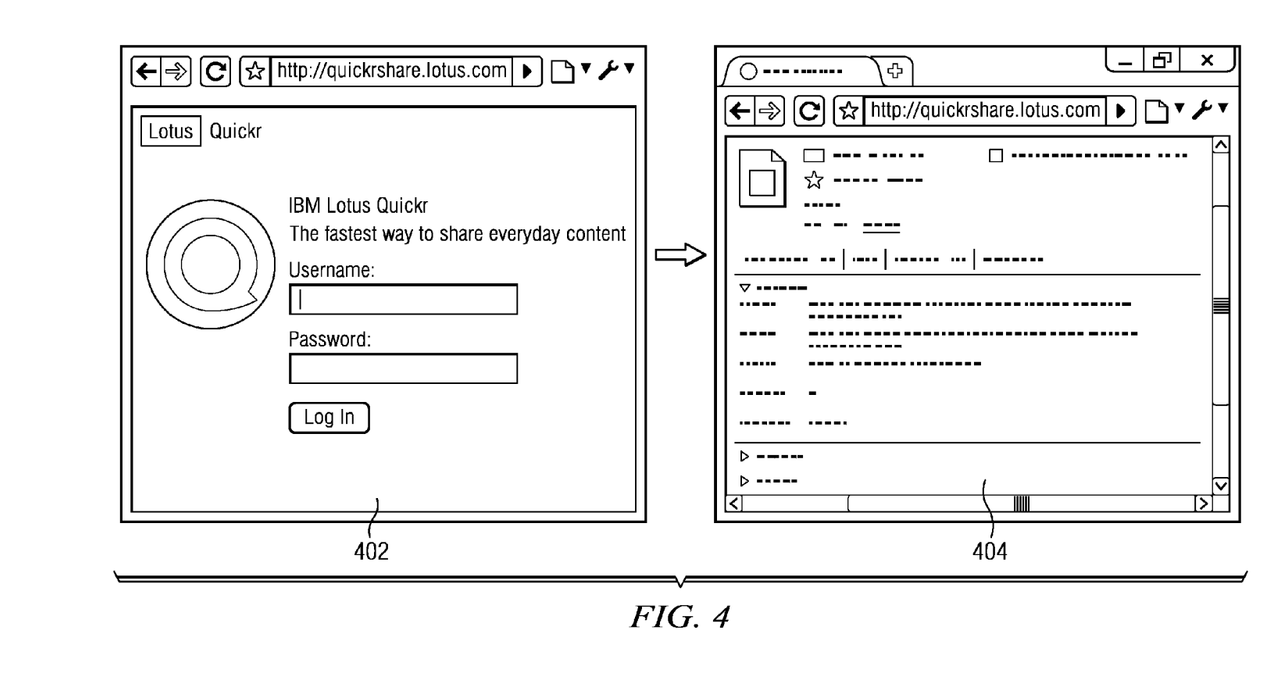
FIG. 4 illustrates a typical use case scenario after the end user of the client application takes an action to launch a web page from within the application user interface (or otherwise) without the technique of this disclosure.

FIG. 4 illustrates a typical use case scenario after the end user of client application 300 takes an action to launch a web page from within the application user interface (or otherwise). This action may be varied, such as clicking on a link, entering a URL, selecting an identified resource, or the like. Because the browser-based application is associated with the client application, it is assumed that the client application launches the browser application automatically (upon the end user taking the action). Except for public or anonymous documents, launching the browser usually results in first showing a login form 402. The login form includes the usual fields (e.g. username and password) that must be filled in before the browser is redirected to the desired target resource, in this example private web page 404. This login form is necessary because the browser application does not have access to the credentials that are already established between the client application 300 and its associated server application 302. This deficiency is addressed by the disclosed solution Auto-Login to a Browser The auto-login solution of this disclosure preferably involves a unique interaction between the client application and the server application that is now described.

The following is a general description of the operation, which assumes that the non-browser-based client application is associated with the server application, and further that the end user has taken an action that causes the non-browser-based client application to launch an associated browser to a target resource (e.g., a secure page). The server application executes an application server (such as IBM® WebSphere® server), which includes support for one or more server-based code functions, typically in the form of J2EE-compliant servlets. A service point on the application server supports a servlet, in a known manner. Upon invocation of the browser, the client application sends a request to a first entry point (e.g., a first servlet) at the server application requesting a one-time-use only Uniform Resource Locator (URL) that can be used to redirect the browser to the target resource. The request includes the credential that has been previously generated when the end user logged into the server application. The server responds by generating a one-time-use key, caching the credential that it received in the request, and returning to the client application a URL-template containing the one-time-use key. This URL-template, which is a data string, is external to the authentication cookie path. The client application receives the URL-template, completes the template (by filing in the URL of the target resource), and launches the browser to this location, which is a second entry point (e.g., a second servlet) at the server application. The server code for this application then uses the one-time-use key to retrieve the cached credential, sets the credential in a response, and returns the response to the browser. Preferably, the response is a Javascript snippet that includes a browser redirect (e.g., an HTTP 302) to the target resource. Because the credential has already been set however, no extra authentication is required by the server. Using this interaction, the client application launches the browser to the target resource, passing the original credential in a seamless manner. If there is any failure during the operation, by default the target page login page is displayed to the end user.

For additional security, the server application preferably removes the key's cache on its first access, thereby preventing the generated key from being used more than once. If desired, a secure HTTP request (e.g., over SSL, TLS, or the like) may be used to protect the passing of the one-time-use key between the client and the server. The server may also invalidate the one-time-use key if the client fails to use it within a specified time period.

In the usual case, the credential-cache (maintained by the server for the specified time period) is unique per client machine/user. This is because auto-login requests from a single user typically will only be sequential (i.e. multiple browser windows are not expected to be launched simultaneously by the same user from the same machine). The described auto-login technique, however, is not limited to sequential auto-login requests. Thus, simultaneous auto-login requests may be implemented. In such case, and in the event a second auto-login request occurs from the same user before a first auto-login request has completed, preferably the first request is abandoned (because the one-time-use key would be replaced in the cache). To facilitate such simultaneous auto-login request processing, the cache credential is stored uniquely per remote address (e.g., IP address, MAC address, or other identifier) and user. If multiple auto-login requests to the server occur from the same client machine at the same time, preferably only one is honored.

Figure 5:
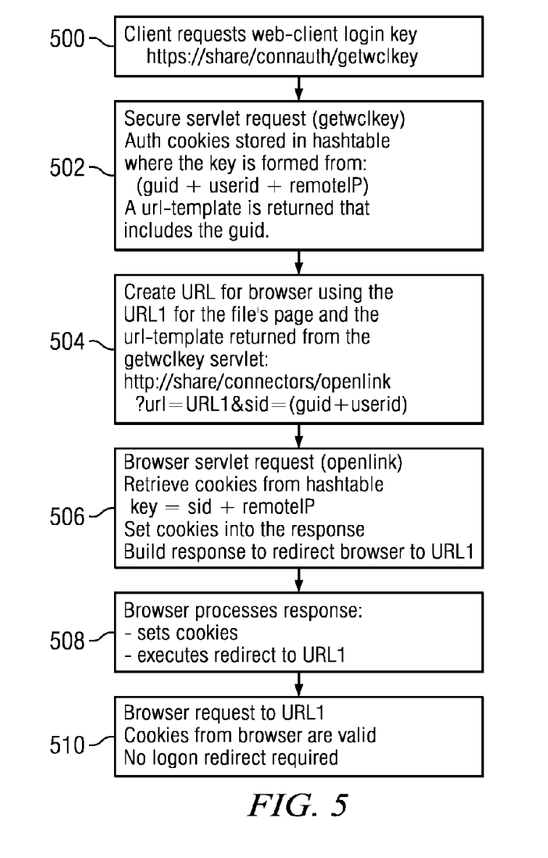
FIG. 5 illustrates a series of interactions between the client application and the server application according to the techniques described herein.

FIG. 5 illustrates the auto-login functionality in more detail including operations of both the client application and the associated server application. As noted above, it is assumed in this scenario that the end user of the client application has already logged into the server application. A credential is associated with this login and is maintained by the client application. The client application has a helper application that supports making HTTP requests, typically a browser counterpart or feature. For the purposes of this further description, this browser counterpart or feature is a web browser. This is not a limitation, however, as the browser may be implemented by any HTTP-based rendering engine or component, or, as noted, any helper application that supports making HTTP requests. The server application has presented one or more target resources to the client application (e.g., by serving a page with target resources identified by hyperlinks). The end user has selected a target resource. Upon this selection, the operations shown in FIG. 5 commence.

Figure 6:
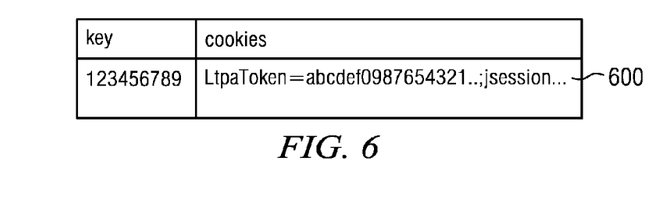
FIG. 6 illustrates a portion of the servlet cache table.
Figure 7:
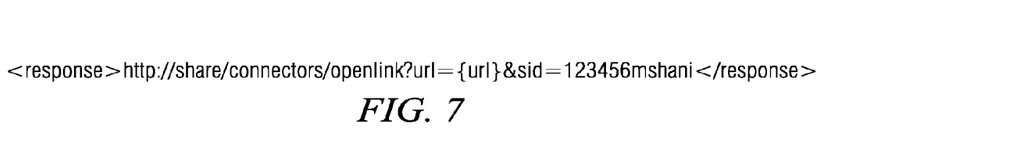
FIG. 7 illustrates a URL-template generated by a first servlet.

At step 500, the client application makes a request for a one-time-use key, referred to herein for convenience as "web-client login key." The request is sent to a first service point on the server application, in this example, a servlet entry point located at the following URL: " . . . //share/connauth/getwclkey." The designation of this entry point is merely for illustrative purposes. Preferably, the request is delivered over a secure connection (e.g., using SSL), although this is not strictly required if the server application otherwise "trusts" the client application via any convenient trust paradigm. The request delivered over this server API includes the credential that was set during the original session between the client application and the server application. At step 502, the application server servlet (called "getwclkey" in this example scenario) receives the secure request. The servlet then performs several functions. It first extracts the credential and stores it in a hash table at a location identified by a key, where the key is derived from a function such as: {guid+userid+remoteIP}. The "guid" is a global identifier, such as an integer that increases in value monotonically, a random number, a pseudorandom number, or the like. The userid is associated with the user making the request, and the remoteIP is the IP address of the client application. The IP address is obtained as the source address in an IP data packet transmitted to the server. The use of the IP address (to identify the client) is merely representative, as alternative or additional information (e.g., without limitation, MAC address, passkey, or the like) may be used for this purpose. Similar data may be included in the function, and other hash functions may be used. FIG. 6 illustrates a portion of the hash table 600 that is generated in this manner, with the key value being 123456789. In addition to storing the credential at the location identified by this hash function, the application server servlet also generates a URL-template (or, more generally, the data string) that is then returned back to the client application. Preferably, the URL-template is not a complete URL; rather, it is response that is adapted to receive additional information to form an actual URL. In this example, the URL-template is of the form illustrated in FIG. 7. This template identifies the application server ("share") and includes an identifier for a second entry point, referred to in this example as "openlink." The template also includes the guid. It is adapted to receive the URL of the target resource. In this example, communications to the second servlet need not be secure, although this is not a limitation.

Figure 8:
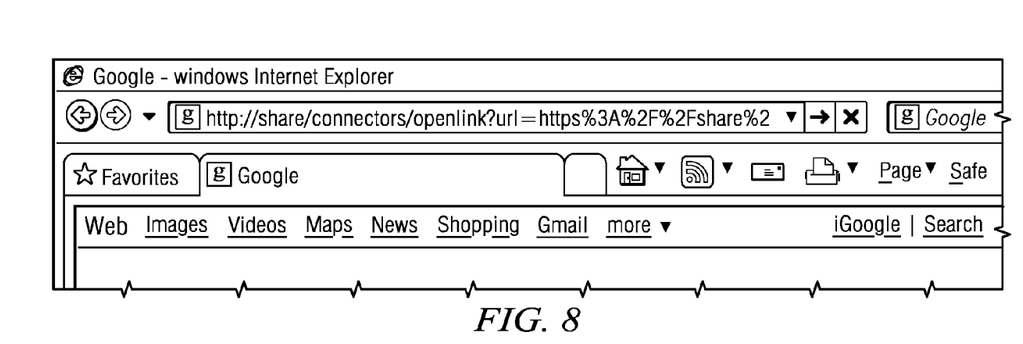
FIG. 8 illustrates the browser process being launched by the client application upon receipt, by the client application, of the URL-template.
Figure 9:
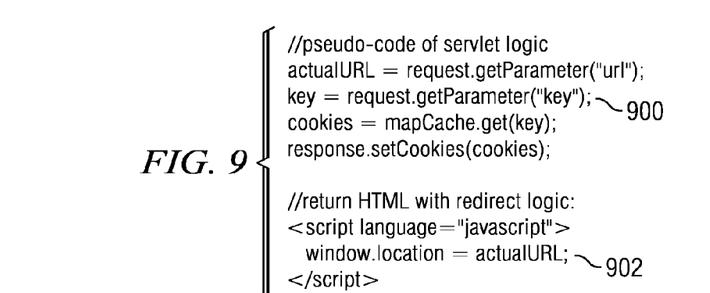
FIG. 9 illustrates sample pseudo-code used by the second servlet, and the resulting HTML snippet created in response to the browser request.

Referring back to FIG. 5, at step 504, the client application receives the URL-template and creates a URL for the browser. In particular, the client application fills in the URL for the target resource (referred to herein as "URL1") and launches the browser to the resulting location, namely: " . . . //share/connectors/openlink?url=URL1&sid= (guid+userid)." As noted above, "openlink" in this example is another application server entry point (e.g., a second servlet, named "openlink"), and in this example scenario simple http may be used (in lieu of https). Of course, the first and second entry points may point to the same servlet. FIG. 8 illustrates the launching of the web browser in this example scenario. At step 506, the server application receives the browser servlet request and performs several operations, as indicated by the pseudo-code 900 illustrated FIG. 9. First, the servlet retrieves the credential from the hash table by rebuilding the key=sid+ remoteIP and performing the necessary lookup. The servlet then sets the cookie (the credential) in the response, and builds a response that is intended to redirect the browser to URL1. The servlet then returns the response, which preferably is a Javascript snippet 902, as illustrated in FIG. 9.

Referring back to FIG. 5, at step 508, the browser associated with the client application receives the response. It sets the cookie, and then executes the redirect to URL1, the original target resource. The browser is then redirected to URL1 at step 510 without requiring an extra login, as the cookie is considered valid. This completes the process.

In a J2EE application server environment, the solution may be packaged in any convenient manner, such as a separate EAR (enterprise archive file) containing a secure WAR (web application archive), and a non-secure WAR. The WAR packages the secure servlet (getwclkey) in the above example, whereas the non-secure WAR is used to package the non-secure servlet (openlink). As noted above, in the example scenario that has been described, the secure servlet handles caching of the cookie and returning of the URL-template; the non-secure servlet handles removing the cookie and redirecting the response to the desired URL. The cache may be persisted as necessary, e.g., to avoid loss upon a cluster failover, although this is not a requirement.

The subject matter described herein has many advantages. It enables automatic and secure passing of a (non-browser based) client application credential to a counterpart browser process that is launched by the client application. This solution obviates the user having to leave his or her logged-in browser process running at all times. It avoids the need for special browser plug-in software or any special browser control to control the authentication cookies. It does not require a single sign-on technology. Conveniently, the approach is implemented with any type of application server or web application.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The application server component may be located in a domain that differs from the domain of one or more back-end applications and, thus, the techniques herein may be practiced in a loosely-coupled server (including a "cloud"-based) environment. The application server itself may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the auto-login functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the client and server components as described are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the components that provide the auto-login functionality.

The servlet function(s) described may be implemented as an adjunct or extension to an existing application server function or operation.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

As noted, the above-described auto-login function may be used in any system, device, portal, site, or the like wherein a non-browser based client application credential needs to be passed to an associated browser process. More generally, the described technique is designed for use in any operating environment wherein given information (including, without limitation, credential data) is desired to be persisted from a client application to an associated browser process in an automated manner.

The term "cookie" should be broadly construed to refer to an HTTP cookie (RFC 2109) or, more generally, any data structure that includes session-specific data associated with the server-side instance that returns that data structure.

The "target resource" as described herein is any non-public or non-anonymous object, such as a service, a server, an application program, a process, a page (e.g., a wiki, a web page, etc.), a file, a linked object, a directory, or the like.

The invention claimed is:

1. A method to facilitate access to a target resource from a non-browser based client application having an associated server application, wherein a credential is associated with the non-browser based client application, comprising:
   receiving a first request, the request including the credential;
   caching the credential at a location identified by a one-time-use key;
   returning a response to the first request that includes a data string that includes the one-time-use key;
   receiving a second request directed to the target resource, the second request having been generated by a browser launched by the non-browser based client application, the browser being co-located with the non-browser based client application;
   retrieving the credential from the location identified by the one-time-use key; and
   setting the retrieved credential in a cookie and returning to the browser a response to the second request that includes the cookie and a redirect to the target resource;
   wherein the credential is automatically passed from the non-browser based client application to the browser and without requiring an additional browser-based login to the target resource.

2. The method as described in claim 1 wherein the first request is a request for a one-time-use URL.

3. The method as described in claim 1 wherein the one-time-use key is generated as a function of the credential and an address associated with the client application.

4. The method as described in claim 1 wherein the data string is a URL-template.

5. The method as described in claim 1 further including using information in the second request to re-generate the one-time-use key.

6. The method as described in claim 1 wherein the response to the second request is an HTML snippet that includes an HTTP 302 as the redirect.

7. The method as described in claim 1 further including removing the credential from the location identified by the one-time-use key following the step of retrieving the credential.

8. The method as described in claim 1 further including invalidating the one-time-use key if the second request is not received within a specific time period, or upon receiving a third request prior to the setting step, the third request including the credential and seeking access to another target resource.

9. Apparatus to facilitate access to a target resource from a non-browser based client application having an associated server application, wherein a credential is associated with the non-browser based client application, comprising:
- a processor;
- computer memory holding computer program instructions that when executed by the processor perform a method comprising:
  - receiving a first request, the request including the credential;
  - caching the credential at a location identified by a one-time-use key;
  - returning a response to the first request that includes a data string that includes the one-time-use key;
  - receiving a second request directed to the target resource, the second request having been generated by a browser launched by the non-browser based client application, the browser being co-located with the non-browser based client application;
  - retrieving the credential from the location identified by the one-time-use key; and
  - setting the retrieved credential in a cookie and returning to the browser a response to the second request that includes the cookie and a redirect to the target resource;
  - wherein the credential is automatically passed from the non-browser based client application to the browser and without requiring an additional browser-based login to the target resource.

10. The apparatus as described in claim 9 wherein the first request is a request for a one-time-use URL.

11. The apparatus as described in claim 9 wherein the one-time-use key is generated as a function of the credential and an address associated with the client application.

12. The apparatus as described in claim 9 wherein the data string is a URL-template.

13. The apparatus as described in claim 9 wherein the method further includes using information in the second request to re-generate the one-time-use key.

14. The apparatus as described in claim 9 wherein the response to the second request is an HTML snippet that includes an HTTP 302 as the redirect.

15. The apparatus as described in claim 9 wherein the method further includes removing the credential from the location identified by the one-time-use key following the step of retrieving the credential.

16. The apparatus as described in claim 9 wherein the method further includes invalidating the one-time-use key if the second request is not received within a specific time period, or upon receiving a third request prior to the setting step, the third request including the credential and seeking access to another target resource.

17. A computer program product in a non-transitory computer readable medium for use in a data processing system to facilitate access to a target resource from a non-browser based client application having an associated server application, wherein a credential is associated with the non-browser based client application, the computer program product holding computer program instructions which, when executed by the data processing system, perform a method comprising:
- receiving a first request, the request including the credential;
- caching the credential at a location identified by a one-time-use key;
- returning a response to the first request that includes a data string that includes the one-time-use key;
- receiving a second request directed to the target resource, the second request having been generated by a browser launched by the non-browser based client application, the browser being co-located with the non-browser based client application;
- retrieving the credential from the location identified by the one-time-use key; and
- setting the retrieved credential in a cookie and returning to the browser a response to the second request that includes the cookie and a redirect to the target resource;
- wherein the credential is automatically passed from the non-browser based client application to the browser and without requiring an additional browser-based login to the target resource.

18. The computer program product as described in claim 17 wherein the first request is a request for a one-time-use URL.

19. The computer program product as described in claim 17 wherein the one-time-use key is generated as a function of the credential and an address associated with the client application.

20. The computer program product as described in claim 17 wherein the data string is a URL-template.

21. The computer program product as described in claim 17 wherein the method further includes using information in the second request to re-generate the one-time-use key.

22. The computer program product as described in claim 17 wherein the response to the second request is an HTML snippet that includes an HTTP 302 as the redirect.

23. The computer program product as described in claim 17 wherein the method further includes removing the credential from the location identified by the one-time-use key following the step of retrieving the credential.

24. The computer program product as described in claim 17 wherein the method further includes invalidating the one-time-use key if the second request is not received within a specific time period, or upon receiving a third request prior to the setting step, the third request including the credential and seeking access to another target resource.

25. A method to facilitate access to a target resource from a non-browser based client application having an associated server application, wherein a credential is associated with the non-browser based client application, comprising:
- generating a first request for a one-time-use URL;
- forwarding the first request, together with the credential, to the server application;
- upon receipt from the server application of a data string that includes a one-time-use key, launching a browser, the browser being co-located with the non-browser based client application;
- directing a second request from the browser to the server application, the second request including data from which the one-time-use key can be re-generated; and
- upon receipt by the browser from the server application of a response to the second request, setting a cookie that includes the credential and redirecting the browser to the target resource;
- wherein the credential is automatically passed from the non-browser based client application to the browser and without requiring an additional browser-based login to the target resource.

26. The method as described in claim 25 wherein the second request includes the credential.

* * * * *